June 25, 1968 G. F. LYMAN 3,389,872

REEL

Filed Jan. 25, 1967 4 Sheets-Sheet 1

INVENTOR
George F. Lyman
BY
Wolf, Greenfield & Hieken

REEL

INVENTOR
George F. Lyman
BY
Wolf, Greenfield & Hieken

INVENTOR
George F. Lyman
BY
Wolf, Greenfield & Hieken

June 25, 1968 G. F. LYMAN 3,389,872

REEL

Filed Jan. 25, 1967 4 Sheets-Sheet 4

INVENTOR
George F. Lyman
BY
Wolf, Greenfield & Hieken

United States Patent Office 3,389,872
Patented June 25, 1968

3,389,872
REEL

George F. Lyman, 307 North Ave.,
Weston, Mass. 02193

Filed Jan. 25, 1967, Ser. No. 611,672
14 Claims. (Cl. 242—71.8)

ABSTRACT OF THE DISCLOSURE

A reel having a hub and a separately formed flange with the hub carrying ribs that serve as cam followers and the flange having cam faces that cooperate with the ribs so as to enable the hub and flange to be releasably secured together by relative rotation of the hub and flange.

*Background and summary of the invention*

The invention relates to reels and more particularly comprises a new and improved computer tape reel having means for automatically establishing concentricity of the two reel flanges when the reel is assembled.

One important object of this invention is to provide a reel having means for accommodating variations in dimensions of the reel flanges and hub and establishing concentricity of the reel flanges on the hub.

Another important object of this invention is to provide a reel which may be assembled without the aid of special jigs or supports to establish the desired relative orientation of the parts.

To accomplish these and other objects, the reel of this invention includes among its features a hub having a ring and a plurality of cam followers secured to it. At least one reel flange is provided in the reel having a plurality of cam surfaces secured to it which cooperate with the cam followers on the hub and which establish the desired orientation of the reel and flange by turning the flange with respect to the hub.

Figure 1:
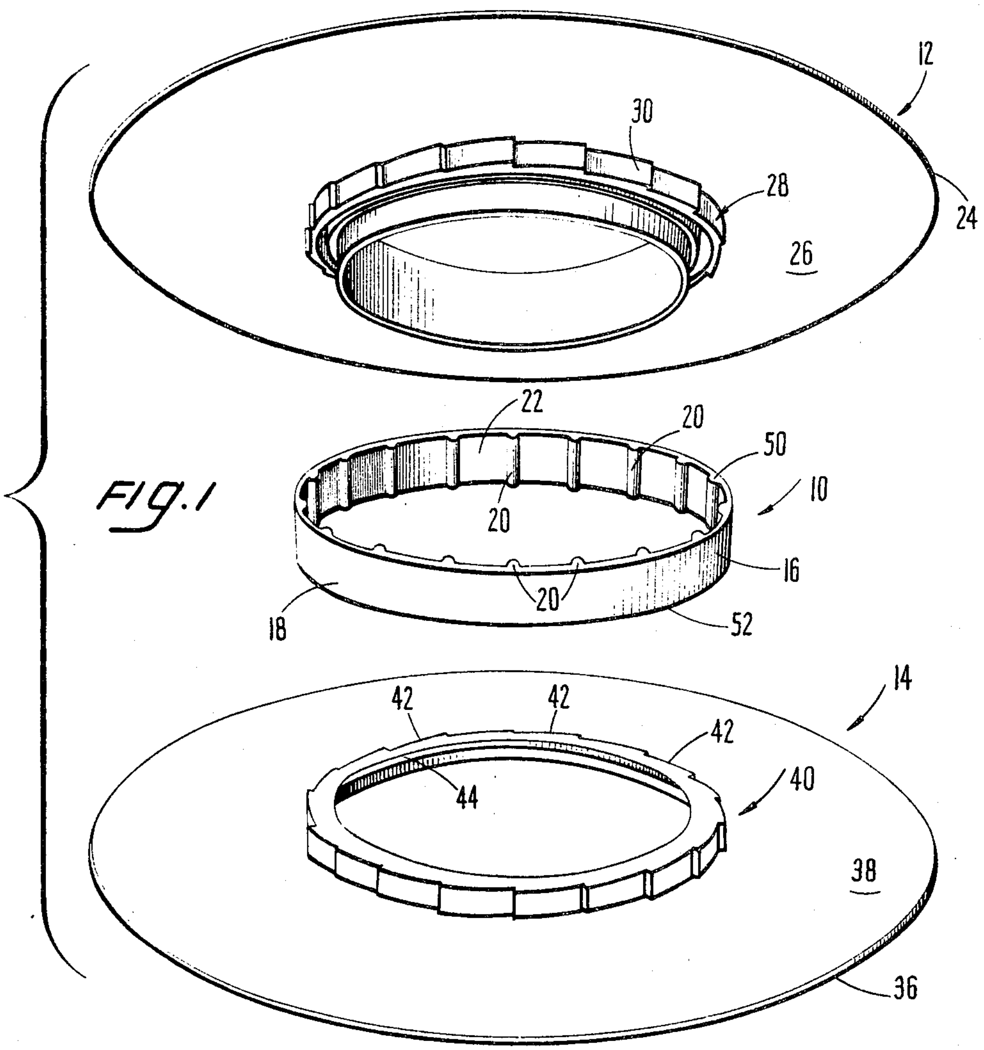
FIG. 1 is an exploded respective view of a reel constructed in accordance with this invention.
Figure 2:
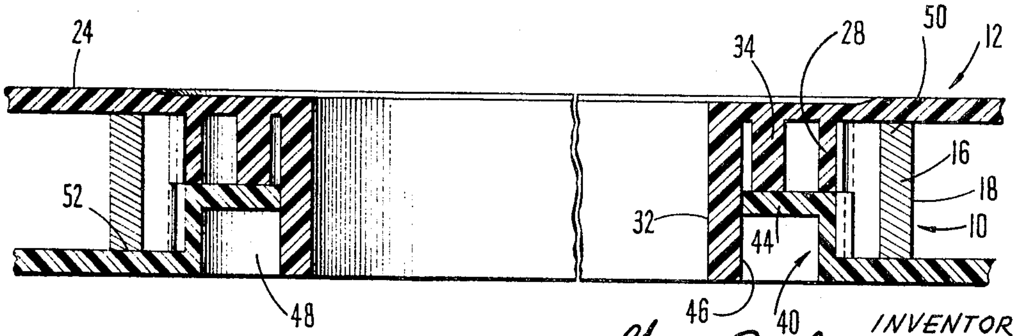
FIG. 2 is a fragmentary cross sectional view of the reel assembled.
Figure 3:
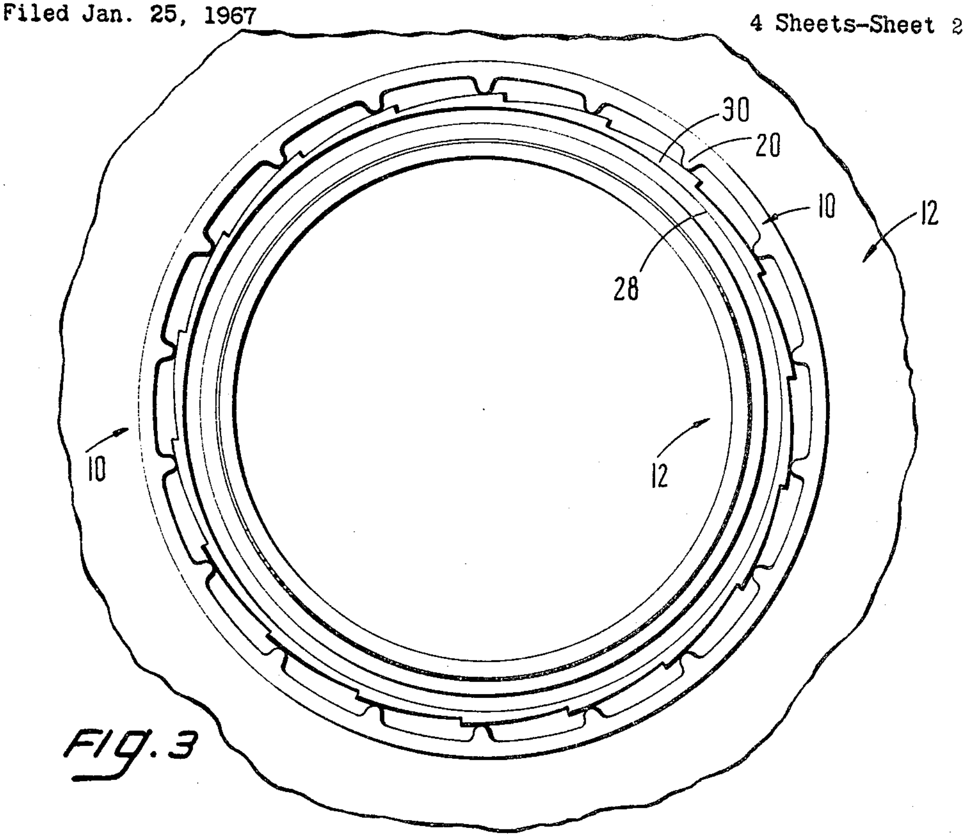
FIG. 3 is a plan view showing the manner in which the hub and one flange of the reel are assembled.

In the preferred embodiment of this invention shown in FIGS. 1–3, the reel is made up of three elements; namely, a hub 10, a front flange 12, and a rear flange 14. The hub 10 preferably is made of aluminum or some other metal having comparable strength and capable of being machined so as to provide true surfaces. The flanges 12 and 14 are preferably made of a moldable plastic material such as polystyrene. While the suggested materials are preferred, it is to be understood that the invention is not limited to those specific materials, and the concepts of this invention are applicable to a wide variety of reels made of a wide variety of materials and intended for diverse uses.

The hub 10 is in the shape of a ring or shallow cylinder having a cylindrical wall 16 which provides a smooth unbroken outer surface 18 upon which the tape to be stored on the reel may be directly wound. In the specific example shown the reel is designed for the storage of computer tape, and as shown in FIG. 2, the outer surface 18 of the wall 16 is exposed to provide a metallic winding surface for the tape.

A plurality of axially extending ribs 20 are formed on the inner surface 22 of the ring 16, which ribs are equally spaced about the ring. The ribs are shown to be rounded at their outer ends, and they serve as cam followers in the manner described below.

The front flange 12 in FIGS. 1 and 2 is shown to have an outer surface 24 and an inner surface 26, and a cylindrically shaped collar 28 is formed on the inner surface 26. The collar 28 is substantially half the width of the hub ring 16 and is provided with a plurality of cam surfaces 30 on the outer surface thereof, which increase in size or height in a circumferential direction as is clearly evident in FIGS. 1 and 3. The cam surfaces 30 are equal in number to the ribs or cam followers 20 on the inner surface of the hub ring 16 and cooperate with them in the manner shown in FIG. 3. The cam surfaces 30 are shown to define a ratchet-type configuration on the collar 28, but the maximum diameter of the collar 28 measured at the outer radial extremities of the cam surfaces exceeds the inner diameter of the hub 10 measured at the inner radial extremities of the ribs 20. The diameter of the collar 28 measured at the inner radial extremities of the cam surfaces 30 is appreciably smaller than the diameter of hub 10 measured at the inner radial extremities of the ribs. Consequently, when the hub 10 is placed about the collar 28 the hub 10 and flange 12 may be rotated relative to one another so as to cause the inner edges of the ribs 20 to bind upon the cam surfaces 30 in the manner shown in FIG. 3. It is evident that if the hub 10 is rotated counter clockwise as viewed in that figure but a few degrees from the position shown, with respect to the flange 12, the inner edges of the ribs 20 will not engage the cam surfaces 30, Consequently, the two parts would not engage or lock with one another. However, from that position, when the hub 10 is rotated clockwise relative to the flange 12, the inner edges of the ribs 20 are caused to bind upon the cam surfaces 30 and releasably hold the two firmly together.

The front flange 12 carries an inner collar 32 which is spaced an appreciable distance from the short collar 28, and the collar 32 serves as a mounting surface at the center of the reel which surrounds the chuck or spindle of the machine on which the reel is to be used. Still a third member or rib 34 is shown in FIG. 2 to be carried by the front flange 12, and the rib 34 is of the same height as the collar 28. The rib 34, as will become apparent below adds rigidity to the assembly and is formed as a separate element from the collars 28 and 32 to reduce the mass of plastic material at the hub. But for the fact that it is desirable to reduce the quantity of material used in the molding of the flange 12, the gaps between the rib 34 and the two collars could be filled with plastic material, so as to form a heavy block at the hub.

The rear flange 14 having an outer surface 36 and an inner surface 38 carries a collar on its inner surface similar to the collar 28 on the front flange 12. The width of the collar 40 is substantially equal to ½ the width of the hub 10, and like the collar 28 carries a plurality of cam faces 42 about its outer surface which increase in height in a circumferential direction. However, as is evident in FIG. 1, the circumferential direction in which the cam surfaces 42 increase, is opposite to the circumferential direction of the cam surfaces 30 on the front flange 12. A step 44 is provided at the inner edge of the collar 40, which when the reel is assembled abuts against the rib 34 and collar 28 of the front flange and the outer surface 46 of the inner collar 32 so as to stabilize the assembly. The step 44 with the collars 40 and 46 define a recess 48 that receives a lockout ring (not shown) as a standard attachment for computer tape reels.

The cam faces 42 formed on the collar 40 cooperate with the ribs 20 on the hub 10 in exactly the same manner as the cam surfaces 30 on the collar 28 of the front reel flange. Thus, the diameter of the collar 40 measured at the radially extremities of the ribs 20, while the inner diameter of the collar 40 measured at the inner radial extremity of the cam faces 42 is appreciably less than the diameter of the hub 10 measured at the inner extremities of the ribs 20. Consequently, the flange 14 may be rotated relative to the collar 10 in the same manner as the flange 12 so as to cause the cam faces 42 to bind to bind upon the inner edges of the ribs 20 in precisely the same manner as shown in FIG. 3 in connection with the front flange 12. However, in order to cause the interference between the ribs or cam followers on the hub 10 and the cam faces 42 on the collar 40, the reel flange 14 must be rotated in a direction opposite to the direction of rotation of the front flange 12.

The side edges 50 and 52 of the hub 10 support and orient the reel flanges 12 and 14 with respect to the winding surface 16 of the hub. Preferably, the side edges 50 and 52 of the hub 10 are machined or otherwise prepared so as to bear a precise orientation with respect to the hub axis. If these surfaces are true and the flanges 12 and 14 are free of distortion, the flanges 12 and 14 when mounted on the hub will be precisely perpendicular to the reel axis.

To assemble the reel, it is only necessary to sandwich the hub 10 between the front and rear reel flanges 12 and 14 with the collars 28 and 40 lying within the hub wall 16. With the reel flanges 12 and 14 abutting against the edges 50 and 52 of the hub, the flanges 12 and 14 are rotated in opposite directions with respect to the hub 10 and in directions causing the cam followers or ribs 20 to ride up on the cam surfaces 30 and 42 of the collars 28 and 40 respectively. This twisting of the reel flanges continues until the cam surfaces bind upon the cam followers and further rotation is prohibited. Thereafter, the flanges may be ultrasonically welded together and/or to the hub permanently to secure the reel in the assembled form. Because the positions of the three parts are established by the cams and cam followers, it is unnecessary to provide special jigs to hold the parts in the desired relationship and allow them to sit in the jigs until such time as they are adhered or welded together. Rather, because the relative positions of the parts is clearly established by the cams and cam surfaces, no jigs are required, and the parts may be left unattended without a press or some special form of support during the setting of an adhesive should adhesive be used to secure the parts together. From the foregoing it will be appreciated that the manner in which the reels are assembled assures concentricity of all the parts and accommodates variations in dimensions because of material and color in the hub and reel flanges.

The embodiment of this invention shown in FIGS. 4–7 is similar to that of the preferred embodiment, but the locations of the ribs on the hub and the cams on the reel flanges are reversed. Thus, in FIG. 4, the hub 60 is shown to be provided with ribs 62 on its outer surface, which ribs extend radially outwardly from the cylindrical wall 64 that defines the hub. The outer reel flange 66 has a short collar 68 on its inner surface 70, which collar in turn is provided with cams 72 having cam faces directed radially inwardly and which cooperate with the outer edges of the ribs 62. The diameter of the hub 60 measured at the outer edges of the ribs 62 lies between the diameters of the collar 68 measured at the outer and inner radial extremes of the cam surfaces 73. The front flange 66 also includes an inner collar 76 that serves to support the reel on the spindle or chuck of the machine on which the reel is used.

The rear flange 74 of the reel has a collar 76 similar to the collar 78 with inwardly facing cams 78 having cam surfaces 80 that rise in a circumferential direction similar to the cam surfaces 73 of the front flange 66. However, the direction of increase in height of the cams 78 on the rear flange 74 is opposite that for the cams 72 on the front flange. The maximum and minimum diameters of the collar 76 measured at the inner and outer extremes of the cams 78 are respectively greater and less than the diameter of the hub 60 measured at the outer extremes of the ribs 62. The rear reel flange 74 also carries an inner collar 82 with a shoulder 84 which define recess 86 for the lockout ring (not shown) and which stabilize the assembly in the manner of the preferred embodiment.

Figures 4, 5:
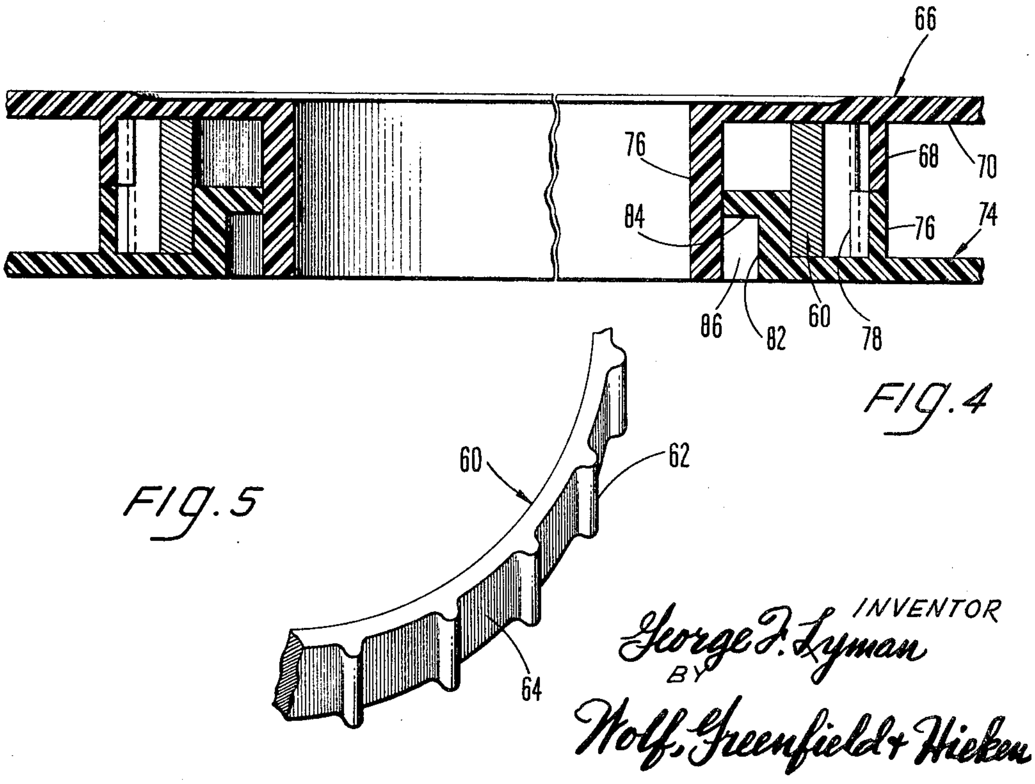
FIG. 4 is a cross sectional view similar to FIG. 2 showing another embodiment of this invention.
FIG. 5 is a fragmentary perspective view of the hub of the reel shown in FIG. 4.
Figure 6:
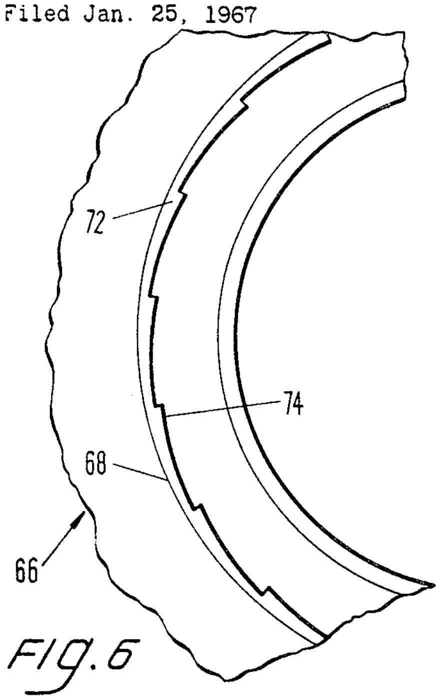
FIG. 6 is a fragmentary bottom plan view of the front flange of the reel shown in FIG. 4.
Figure 7:
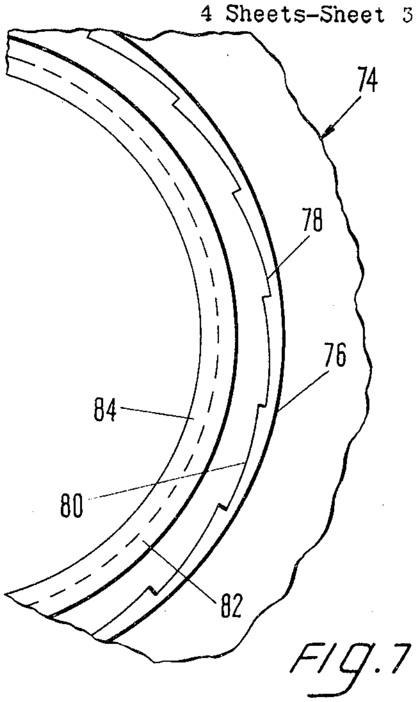
FIG. 7 is a fragmentary top plan view of the rear flange of the reel shown in FIG. 4.

It will be appreciated that the embodiment of FIG. 4 may be assembled in the same manner as the preferred embodiment. Thus, the reel flanges 66 and 74 sandwich the hub 60 with the hub lying within the collars 68 and 76. The reel flanges are rotated in opposite directions with respect to the hub 60 causing the outer edges of the ribs 62 to bind firmly against the cam surfaces 73 and 80 respectively. When assembled, the parts may be ultrasonically welded together or be secured together by adhesive or some other means permanently to preserve the integrity of the assembly.

Figures 8, 9:
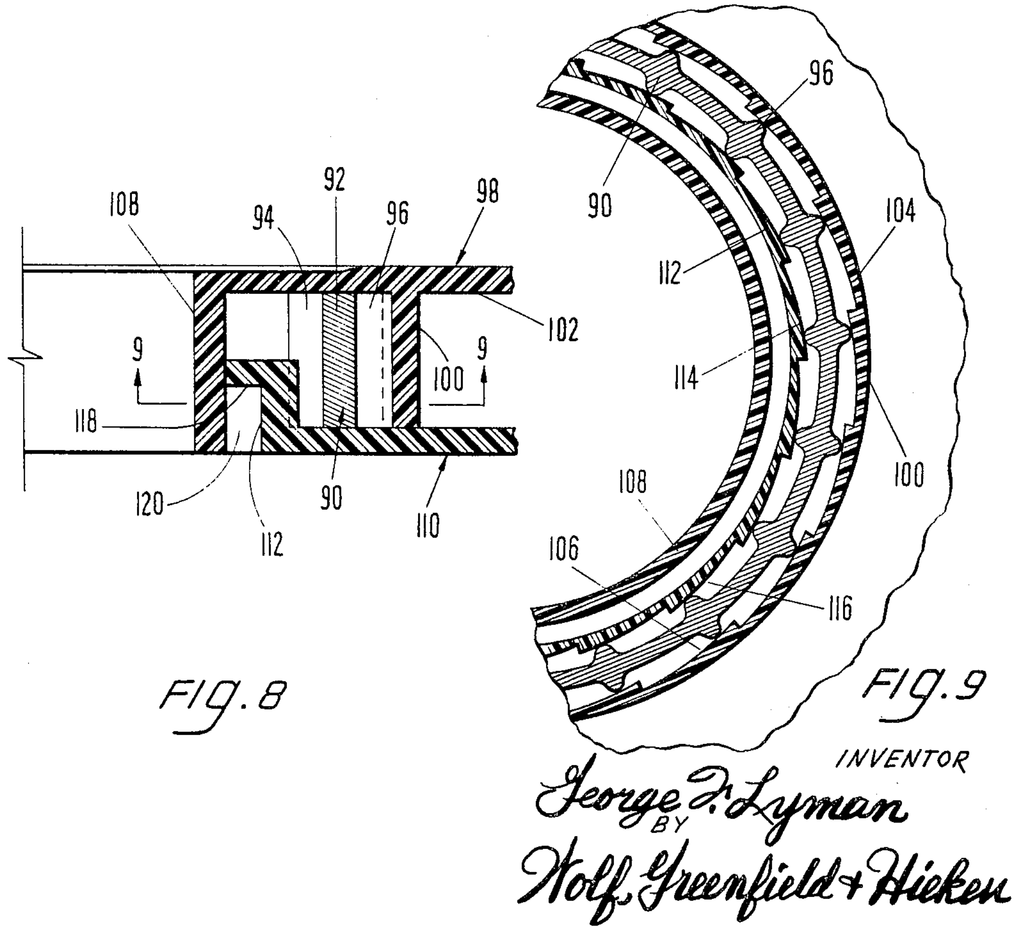
FIG. 8 is a fragmentary cross sectional view similar to FIG. 2 showing another embodiment of this invention.
FIG. 9 is a fragmentary cross sectional view taken along the section line 9—9 of FIG. 8.

The embodiment of FIGS. 8 and 9 includes certain features of each of the other embodiments. Thus, the hub 90 includes a cylindrical wall 92 having inwardly and outwardly extending ribs 94 and 96 respectively that may be the same as ribs 20 and 62 of the previously described embodiments. The front flange 98 carries a collar 100 on its inner surface 102, which collar is substantially the same width as the hub 90 and carries inwardly extending cams 104 having cam surfaces 106. The cam surfaces 106 bear against the outer radial extremities of the ribs 96 to lock the front flange 98 in place on the hub in the same manner as the cams 78 in the embodiment of FIG. 4. The front flange 98 also has an inner collar 108 spaced from the inner ends of the ribs 94, which serves as a support for the reel when it is placed on a spindle or chuck of the machine upon which the reel is used.

The rear flange 110 carries an inwardly extending collar 112 upon which are formed cams 114 having cam surfaces 116 substantially identical to the cam surfaces 42 of the preferred embodiment. The collar 112 like the collar 40 of the preferred embodiment also includes a shoulder 118 and defines in part the lockout ring recess 120.

To assemble the reel of FIGS. 8 and 9, the hub 90 is sandwiched between the flanges 98 and 110, and the two flanges are rotated in opposite directions with respect to the hub 90. Consequently, the cam surfaces 106 and 116 bind upon the outer edges of the ribs 96 and the inner edges of the ribs 94 respectively to releasably secure the entire assembly together in the desired relationship. While so assembled, the parts may be ultrasonically welded or adhesively secured together by any of the well known methods.

Figure 11:
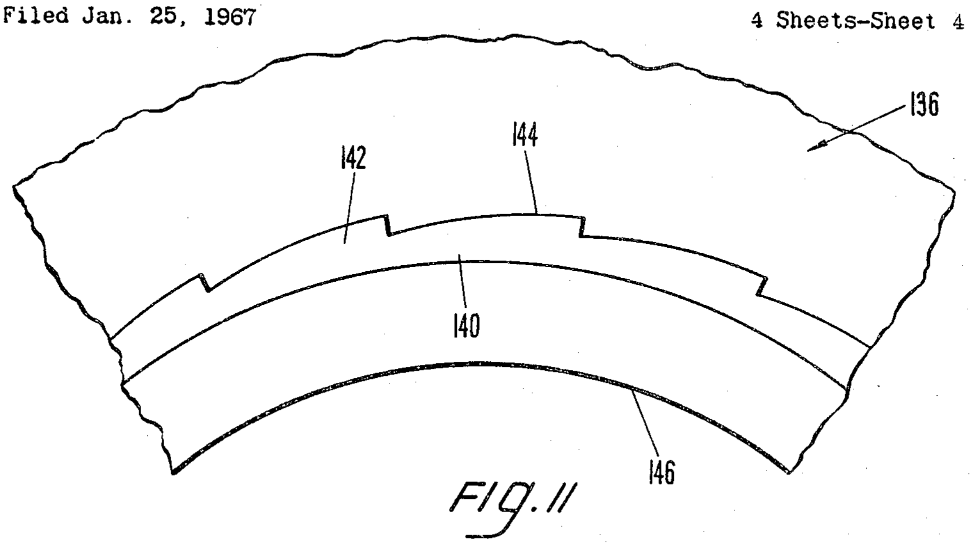
FIG. 11 is a fragmentary bottom plan view of the front flange of the reel shown in FIG. 10.
Figure 10:
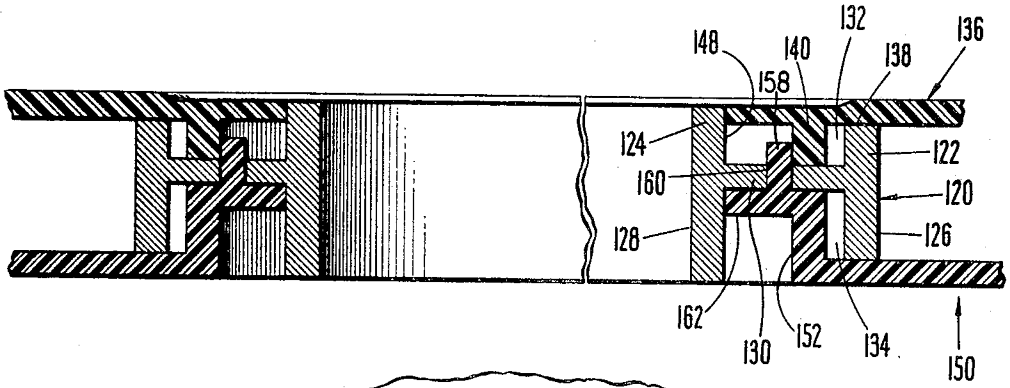
FIG. 10 is a fragmentary cross sectional view similar to FIG. 2 showing yet another embodiment of this invention.
Figure 12:
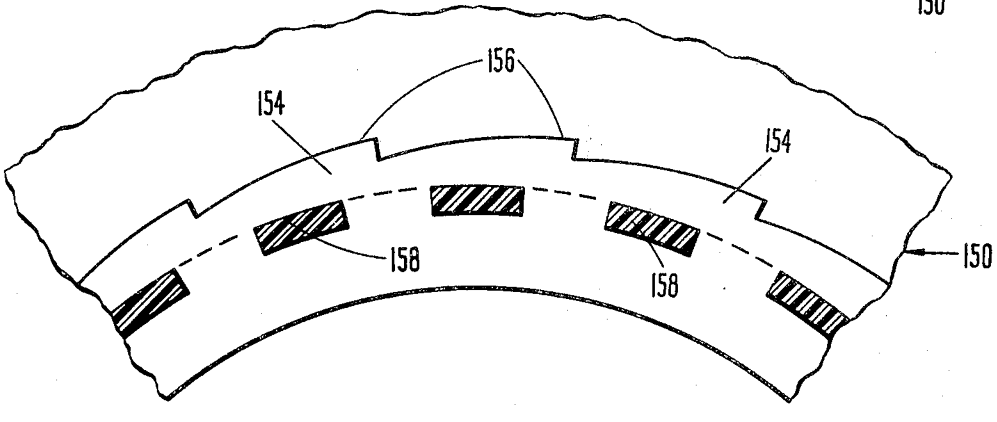
FIG. 12 is a fragmentary top plan view of the rear flange of the reel shown in FIG. 10.

In the embodiment of FIGS. 1–3, the reel has a winding surface defined by the hub and a spindle surface defined by a collar on one of the reel flanges. In the embodiments of FIGS. 4–7 and FIGS. 8 and 9, both the winding surface for the tape and the spindle surface are formed by collars which form part of the reel flanges. In the embodiment of FIGS. 10–12, the hub defines both the winding surface for the tape and the spindle surface, but the hub is provided with ribs which serve as cam followers to orient the reel flanges. In many respects the reel shown in FIGS. 10–12 is similar to that shown in Burgess et al. Patent No. 3,229,928. However, the cam and cam follower arrangement of the preferred embodiment of FIGS. 1–3 is incorporated into the reel.

In FIG. 10 the reel is shown to include a hub 120 which is generally in the shape of an I-beam in cross section having an outer cylindrical wall or ring 122 and an inner cylindrical wall or ring 124. The outer surface 126 of the ring 122 defines the tape winding surface, while the inner surface 128 of the ring 124 defines the spindle surface.

The inner and outer rings 122 and 124 are connected by a web 130, and inwardly extending radial ribs 132 and 134 are formed on the inner surface of the outer ring 122, which ribs in combination function as the ribs 20 in the preferred embodiment.

A front reel flange 136 rests on the side edge 138 of the outer ring 122 of the hub, and the reel flange 136 carries an inwardly extending collar 140 having cams 142 formed on its outer surface which extend radially outwardly from the collar and carry cam faces 144. The cam faces 144 as shown in FIG. 11 are substantially identical to the cam faces 30 in the preferred embodiment, and the cam faces cooperate in the same manner as the cam faces 30 of the preferred embodiment to lock on the ribs 132. The inner edge 146 of the reel flange 136 terminates adjacent the outer face 148 of the inner ring 124 as is evident in FIG. 10.

The inner reel flange 150 includes a collar 152 that carries outwardly directed cams 154 with cam faces 156 which cooperate with the ribs 134 on the hub to releasably lock the lower flange on the hub in the same manner as the cams 42 of the preferred embodiment cooperate with the ribs 20 on the hub.

Like the Burgess patent, supra, the reel flange 150 carries a plurality of spaced arcuate tongues 158 that extend through arcuate slots 160 in the web 130 of the hub, which tongues contact the inner surface of collar 140 of the front flange 136. The circumferential width of the slots 160 in the web 130 exceeds the circumferential width of the tongues 158 so as to permit relative rotation of the reel flange 150 with respect to the hub.

The collar 152 of the reel flange 150 also includes a step 162 extending radially inwardly from the inner edge of the collar 152, which step bears against the web 130 of the hub to stabilize the assembly.

The reel of FIGS. 10–12 is assembled in the same manner as the reels in the other embodiments; namely, the hub 120 is sandwiched between the reel flanges (with the tongues 158 extending through the arcuate slots 160) and the reel flanges are rotated relative to one another. This action causes the inner edges of the cam followers or ribs 132 and 134 to ride up on the cam surfaces 144 and 156 respectively and releasably lock the three parts which comprise the reel in the desired assembled relationship. Thereafter, the flanges may be ultrasonically welded together or to the hub to achieve the permanent physical relationship of the parts.

In each of the embodiments of this invention shown and described, it may be desirable to insert between the cam followers on the hub and the cam surfaces on the reel flanges a buffer or gasket of yieldable material so as to compensate for relative expansion or contraction of the hub and flanges when made of different materials particularly when the reels are exposed to large changes in temperature. The gasket would absorb certain stresses and prevent the transfer of stresses from one element of the reel to another, which could cause cracking of one or more of the parts.

From the foregoing description it will be appreciated htat because of the manner in which the reel flanges are twisted with respect to the hubs of the several embodiments, the reel flanges automatically are centered with respect to the hubs so that the reel flanges are precisely coaxially oriented with respect to the hub and with each other. If the side edges are accurately formed, they will serve precisely to orient the flanges in the desired planes with respect to the reel axis.

Once the reel flanges are oriented on the hub as the result of the relative rotation of the parts, the parts may be immediately secured together by ultrasonic welding and no other supports are required to maintain the parts in their desired relationship during the welding operation. Regardless of the type of means employed to secure these parts together, the releasable locking of the parts achieved merely by their physical shapes does away with the need for special assembling techniques and equipment.

It should also be appreciated that as another advantage of this invention the hub of the embodiments of FIGS. 1–3, 4–7 and 8–9 may be extruded in long lengths and thereafter be cut to the proper length and if necessary the sides may be machined to provide the proper angular relationship between the hub axis and the side edges which support and orient the reel flanges.

From the foregoing description those skilled in the art will appreciate that numerous modifications may be made on this invention without departing from its spirit. For example the hub of the reel could be integrally formed with one of the flanges reducing the number of cam and cam follower connections to one. Moreover, it is to be clear that the hub need not be made of metal, but rather may be made of plastic or some other material the same as or different from the reel flanges. Therefore, it is not intended to limit the breadth of this invention to the specific embodiments illustrated and described. Rather, it is intended that the scope of this invention be determined by the appended claims and their equivalents.

What is claimed is:

1. A tape reel comprising a hub in the shape of a ring and a plurality of cam followers secured to the ring, and at least one reel flange having a plurality of cam surfaces facing and operatively cooperating with at least some of the cam followers for orienting the flange on the hub when the flange and hub are rotated with respect to one another.

2. A tape reel as described in claim 1 further characterized by, said hub having a side edge which defines a seat for the inner surface of the flange, said flange having an inner surface abutting against the side edge when the flange is secured to the hub.

3. A tape reel as described in claim 2 further characterized by said ring being generally cylindrical in shape, and said cam followers being a plurality of ribs on the inner surface of the cylindrical ring and extending inward from the ring, a collar on the flange, and said cam surfaces being on the flange collar facing outwardly from the collar and increasing in height in a circumferential direction on said collar with the diameter of said collar measured over the cam surfaces at the high ends of the cam surfaces exceeding the diameter of the hub measured at the inner ends of the ribs.

4. A tape reel as described in claim 3 further characterized by a second reel flange having inner and outer surfaces with a collar secured to its inner surface, a second group of cam surfaces on the collar and facing radially outward therefrom and increasing in height in a circumferential direction on said collar and oepratively cooperating with said followers to orient the second flange on the hub.

5. A tape reel as described in claim 4 further characterized by said second group of cam surfaces increasing in height in a circumferential direction opposite to that of the cam surfaces on the first flange when the two flanges are rotated in opposite directions on the hub to cause the cam surfaces to hold the followers.

6. A tape reel as described in claim 1 further characterized by a second reel flange separate from the hub having a plurality of cam surfaces facing and operatively cooperating with at least some of the cam followers for orienting the second flange on the hub when the flange and hub are rotated with respect to one another.

7. A tape reel as described in claim 6 further characterized by said cam surfaces on the second reel flange being oriented in a direction opposite to the cam surfaces on the first-recited reel flange whereupon rotation of the second reel flange is opposite that of the first reel flange to orient the flanges on the hub.

8. A tape reel as described in claim 1 further characterized by the hub being made of a material different from the flange, and means for permanently securing the hub to the flange.

9. A tape reel as described in claim 7 further characterized by the reel flanges being ultrasonically welded together.

10. A tape reel as described in claim 2 further characterized by said ring being generally cylindrical in shape, and said cam followers including a plurality of ribs on the outer surface of the cylindrical ring and extending outwardly from the ring, a collar on the flange, and said cam surfaces being on the flange collar facing inwardly from the collar increasing in height in a circumferential direction on said collar.

11. A tape reel as described in claim 10 further characterized by the cam followers including additional ribs on the inner surface of the cylindrical ring and extending inwardly from the ring, a second reel flange, a collar on the second flange, and a plurality of cam surfaces on the collar of the second flange facing outwardly from the collar and increasing in height in a circumferential direction opposite to that of the surfaces on the first-recited reel flange and operatively cooperating with the additional ribs whereby the flanges are rotated in opposite directions to secure the cam surfaces on the ribs.

12. A tape reel as described in claim 6 further characterized by said hub being in the shape of an I-beam with the ring being the outer flange of the I-beam, said cam followers being ribs provided on the inner surface of the ring and extending inwardly therefrom, and cam surfaces facing outwardly on the flanges.

13. A tape reel comprising a hub in the shape of a ring and a plurality of cam members secured to the ring, and at least one reel flange having a plurality of cam members facing and operatively cooperating with at least some of the cam members on the hub for orienting the flange on the hub when the flange and hub are rotated with respect to one another.

14. A tape reel as described in claim 13 further characterized by a second reel flange separate from the hub having a plurality of cam members facing and operatively cooperating with at least some of the cam members of the hub for orienting the second flange on the hub when the second flange and hub are rotated with respect to one another.

References Cited

UNITED STATES PATENTS

| | | | |
|---|---|---|---|
| 1,316,972 | 9/1919 | Prentiss | 242—118.62 |
| 3,088,689 | 5/1963 | Perlini. | |

FRANK J. COHEN, *Primary Examiner.*

N. MINTZ, *Assistant Examiner.*